(12) United States Patent
Holmström et al.

(10) Patent No.: US 6,198,939 B1
(45) Date of Patent: Mar. 6, 2001

(54) MAN MACHINE INTERFACE HELP SEARCH TOOL

(75) Inventors: Tomas Holmström, Dalby; Johanna Isberg; Hassan Mahini, both of Lund, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/994,042

(22) Filed: Dec. 19, 1997

(51) Int. Cl.[7] .......................................... H04B 1/38
(52) U.S. Cl. ..................... 455/550; 455/566; 455/575
(58) Field of Search ................................ 455/464, 550, 455/563, 566, 567, 575, 90; 345/352, 353

(56) References Cited

U.S. PATENT DOCUMENTS

| | | |
|---|---|---|
| 4,291,198 | 9/1981 | Anderson et al. . |
| 4,872,196 | 10/1989 | Royer et al. . |
| 4,899,368 | 2/1990 | Krohn et al. . |
| 5,371,779 | 12/1994 | Kobayashi . |
| 5,422,656 | 6/1995 | Allard et al. . |
| 5,432,902 | 7/1995 | Matsumoto . |
| 5,481,595 | 1/1996 | Ohashi et al. . |
| 5,561,705 | 10/1996 | Allard et al. . |
| 5,568,536 | 10/1996 | Tiller et al. . |
| 5,594,778 | 1/1997 | Schaupp, Jr. et al. . |
| 5,761,610 * | 6/1998 | Sorensen et al. ..................... 455/575 |
| 5,797,098 * | 8/1998 | Schroeder et al. ................... 455/464 |
| 5,826,199 * | 10/1998 | Maeda .................................. 455/550 |

FOREIGN PATENT DOCUMENTS

| | | |
|---|---|---|
| 0 567 333 | 10/1993 | (EP) . |
| 0 570 116 | 11/1993 | (EP) . |
| 0 788 268 | 8/1997 | (EP) . |
| 97/04580 | 2/1997 | (WO) . |

* cited by examiner

Primary Examiner—Thanh Cong Le
(74) Attorney, Agent, or Firm—Burns, Doane, Swecker & Mathis, L.L.P.

(57) ABSTRACT

A man-machine interface (MMI) help and search tool in association with a menu structure and selection capability is disclosed. According to an exemplary embodiment, the mobile phone and more specifically the MMI are provided with a help search function to instruct the user how to find, activate, or select a desired function of the phone. The user may search for any and all commands regarding a specific subject of interest to the user. The search tool is intelligent and may be used to identify a specific command or function or to conduct a search based on a letter or partial command to provide listings and instructions for any number or series of related commands in a specific subject area. When the user has found the desired command the search tool may be used to explain how the command is accessed and activated and allow the user to automatically go to that menu or execute that command. The search tool can easily be accessed from any number of menus for example, via a hard or soft button can be placed in a search mode and use the initials of the functions or commands as to find and execute a desired function quickly without having to step through various levels of menus.

23 Claims, 6 Drawing Sheets

MAN MACHINE INTERFACE HELP SEARCH TOOL

BACKGROUND

The invention is related to man-machine interfaces with menu structures supporting various functions and in particular facilitating user interaction with the menu structure for setting or activating functions associated with handheld or cellular mobile phones through use of the menu structures.

As mobile phones have become increasingly complex, a great number of additional features have been included with mobile phones giving users an increased number of options and capabilities for use with their phones. A mobile phone herein after refers to any portable radio communication equipment such as mobile stations, communicators, so called electronic organizers or the like. In order to activate any function associated with the phone, it is typically necessary for a user to push a series of buttons on the phone in order to set or activate the desired function. Alternatively, some phones are provided with displays having menus that require the user to make a number of selections by stepping through a number of menu layers in order to find and set the desired function.

Menus are typically hierarchical containing various levels of associated functions. When using the menu in mobile phones to activate or set a function, it is possible to step through the menu by pressing arrow keys, or the like, for functions in the same level and <YES> or <NO> between the levels, for example. It should be noted that mobile phones with a graphical display typically present the top level of the menu through the use of icons, or the like. An example of such a mobile phone with graphically display menu is described in U.S. Pat. No. 5,422,656.

However, with the increasing number and variety of functions provided in association with mobile phones, it is often impossible for a user to keep track of or even know all of the functions that are associated with any particular phone. As a result, if the user wishes to utilize a function that is unfamiliar, the user must carefully search and read through an extensive operator's manual or attempt to use the function from memory through a series attempts by pushing buttons or activating menu screens through trial and error. Furthermore, it is often impossible for novice users to even be aware of all functions or capabilities of the phone that can be accessed through the menu structure associated with the phone.

Also, new and experienced users both may have difficulty in remembering how certain functions are denoted and accessed because different companies may use slightly different names for commands and functions associated with their phones. For example, if a user wishes to have incoming calls transferred to another phone when the user's phone is busy, the user would want to know if this function is provided by their particular mobile phone and if so how to activate it. In this situation a user must either refer to the operator's manual or rely on previous experience. User interviews illustrate that the common user is normally reluctant to "look things up" in a reference manual and, as a result, many of the phone's features are not used and the mobile phone's capabilities are not exploited to their fullest extent.

Additionally, even if a user is familiar with a function it is often difficult for the user to remember the exact position of every function in the hierarchy of levels of the menus. This requires the user to step through a number of menus by trial and error to find the desired function.

Even if the user is familiar with the location of a function within the menu structure, in order to activate the function the user must still step through a number or series of menus in order to reach and set the desired function. This can be frustrating to a user of a mobile phone with a large number of functions, requiring the user to spend an undue amount of time to set or change the desired functions. This can also lead to functions going unused and result in the mobile phone being used in less than an optimal manner.

SUMMARY

It is therefore an object of the invention to improve and facilitate overall use of mobile phone functions.

It is another object of the invention to allow the user to use desired features and functions of the phone quickly and reduce the overall number of entries or steps needed to activate or use any particular feature, function, or command.

It is a further object of the present invention to allow a user of a phone to easily locate and set desired functions of the phone regardless of whether the user remembers how to use or activate the desired functions.

According to an exemplary embodiment of the present invention the foregoing and other objects are accomplished through implementation of a man-machine interface (MMI) help and search tool in association with a menu structure and selection capability.

According to an exemplary embodiment, the mobile phone and more specifically the MMI are provided with a help search function to instruct the user how to find, activate, or select a desired function of the phone by placing the mobile phone in a "search-mode". According to this embodiment, the help function is implemented through a search feature allowing the user, for example when the phone is powered on, or, after a change of the SIM (Subscriber Identity Module), to enter a command or, alternatively a question can be displayed to the user such as, "Do you wish to search for a command?" The user may now search for any and all commands regarding a specific subject of interest to the user.

According to this embodiment an intelligent search tool is provided in the phone such that various commands and features can be identified through a user entry for a specific command or may also implement a search based on various comparison abilities to provide listings and instructions for any number of series of related commands in a specific subject area. When the user has found the desired command the search tool can point out how the command may be accessed and activated and also provide for the user to automatically go to that menu or execute that command if the user wishes to. According to an exemplary embodiment the search tool can easily be accessed from any number of menus for example, via a hard or soft button. According to this solution, the search tool enables new as well as experienced users to access functions of the phone in a fast and convenient manner even if the user is unfamiliar with the phone in question.

In addition, according to another exemplary embodiment, an improved menu access structure is provided in which the key pad of a mobile is used in the search mode to enter the initials of the functions as a search approach for finding the desired function quickly. According to an exemplary embodiment, by pressing a button, for example, a clear button, (or in the case of an idle mode use of volume keys on the side of the mobile phone by pressing the up or down button) the mobile phone can be placed in the search-mode. Accordingly, the user does not need to remember the exact position or function names of functions in the menu structure in order to access or use a certain function. In addition, the number of buttons or entries needed to find the functions in the menu is reduced resulting in faster access of the menu functions and increased user friendliness and satisfaction.

BRIEF DESCRIPTION OF THE DRAWINGS

The foregoing and other features, objects, and advantages of the invention will be better understood by reading the following description in conjunction with the drawings, in which.

DETAILED DESCRIPTION

The various features of the invention will now be described with respect to the figures, in which like parts are identified with the same reference characters.
Help Search-Mode Function With the increasing complexity and variety of mobile phones on the market, it has become difficult for both experienced and novice users to keep track of all of the functions and commands provided by the phones. To make matters worse, users want to be able to activate and use their phones functions and commands quickly without having to read lengthy user manuals. Furthermore, manuals are not always handy. Also, some functions are rarely used and therefore the user quickly forgets how to activate or use the function. In addition, the user may forget the name of the function.

Figure 1:
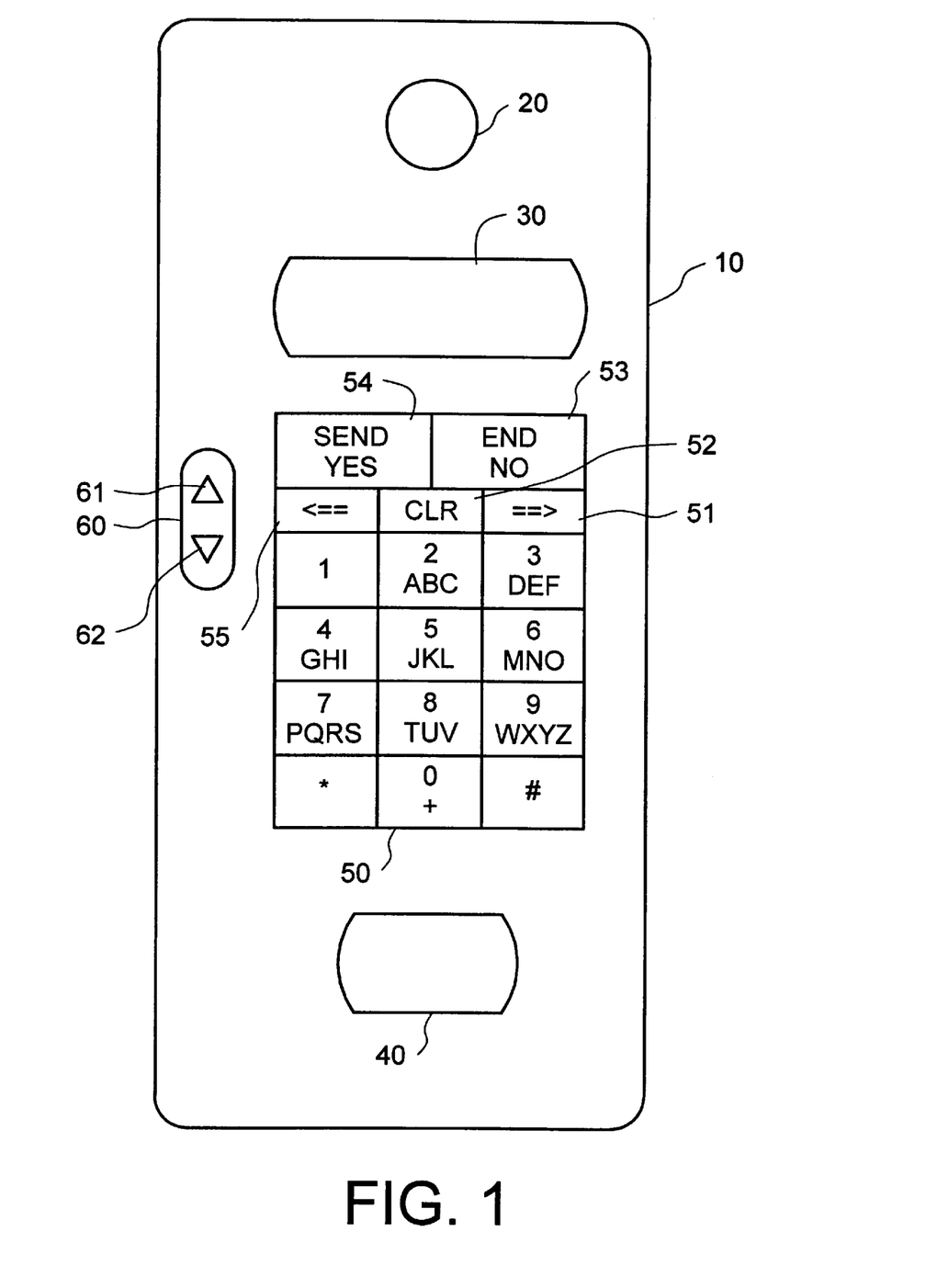
FIG. 1 illustrates an exemplary mobile phone for use with the present invention.

According to an exemplary embodiment of the present invention, a mobile phone is provided with a search help tool in order to allow both experienced and novice users to quickly find and use any function or command provided by the mobile phone. Turning to FIG. 1 a typical mobile phone is depicted. One of skill in the art will appreciate that this phone is exemplary only and that numerous types of displays and input devices are available through different phones such as LCDs, LEDs, soft keys, hard keys, touch screen displays, etc.

A typical mobile phone 10 is illustrated by FIG. 1 having a loudspeaker 20, microphone 40, display 30, and keypad 50. The keypad is provided with various keys for activating functions of the phone including YES and NO keys 53 and 54, respectively, a clear key 52, right 51, and left 55 arrow keys. Some mobile phones also use the NO key 53 as a power ON/OFF switch. In addition, separate volume control 60 can be provided by buttons 61 and 62.

According to this exemplary embodiment, one way of resolving the problem described above is to provide a Man Machine Interface (MMI) associated with the phone having a help-function. This feature may be provided in the form of a 'search function' as described in greater detail below.

Figure 2A:
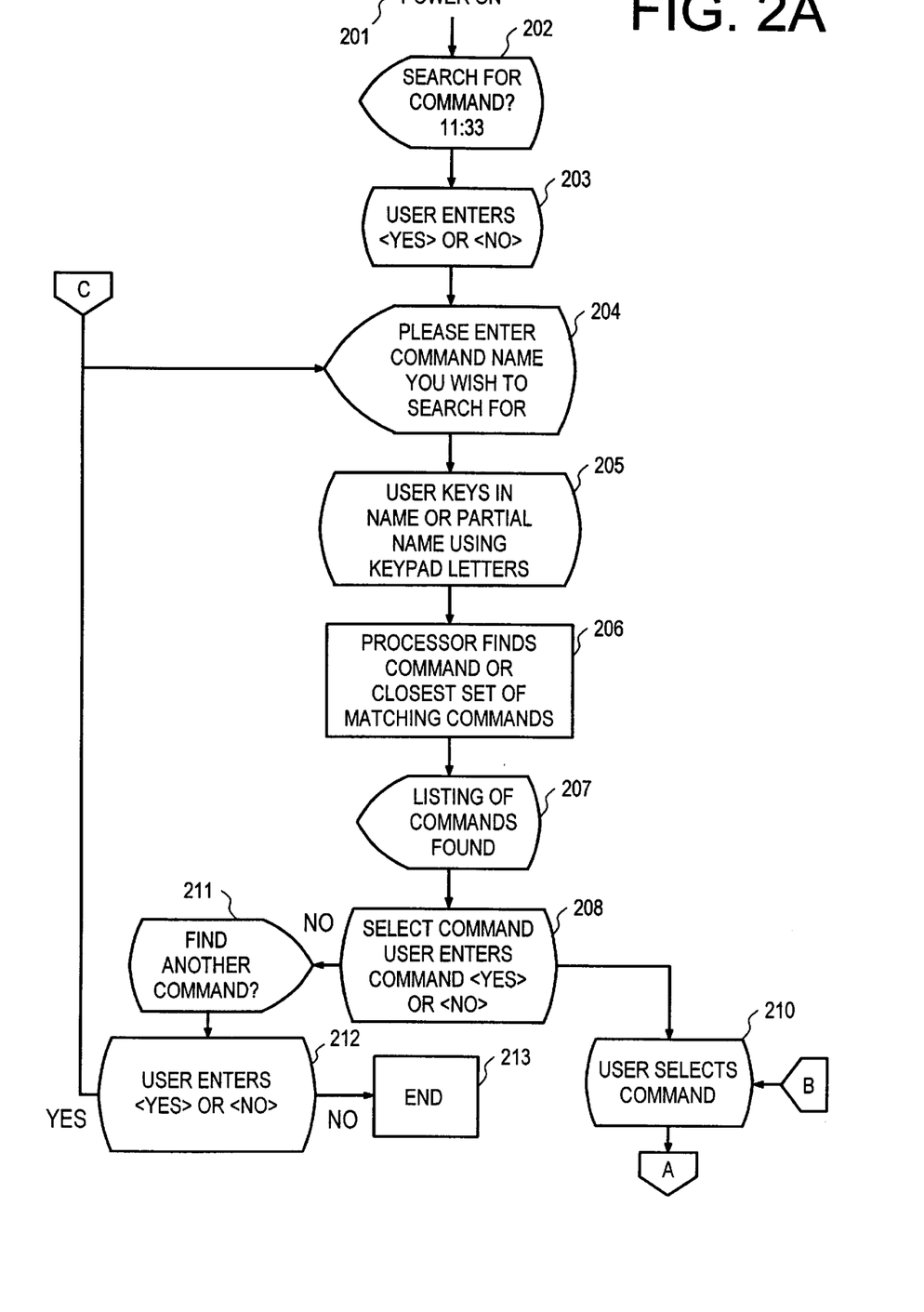
FIGS. 2A and 2B are exemplary flow diagrams of a help search function according to the present invention.
Figure 2B:
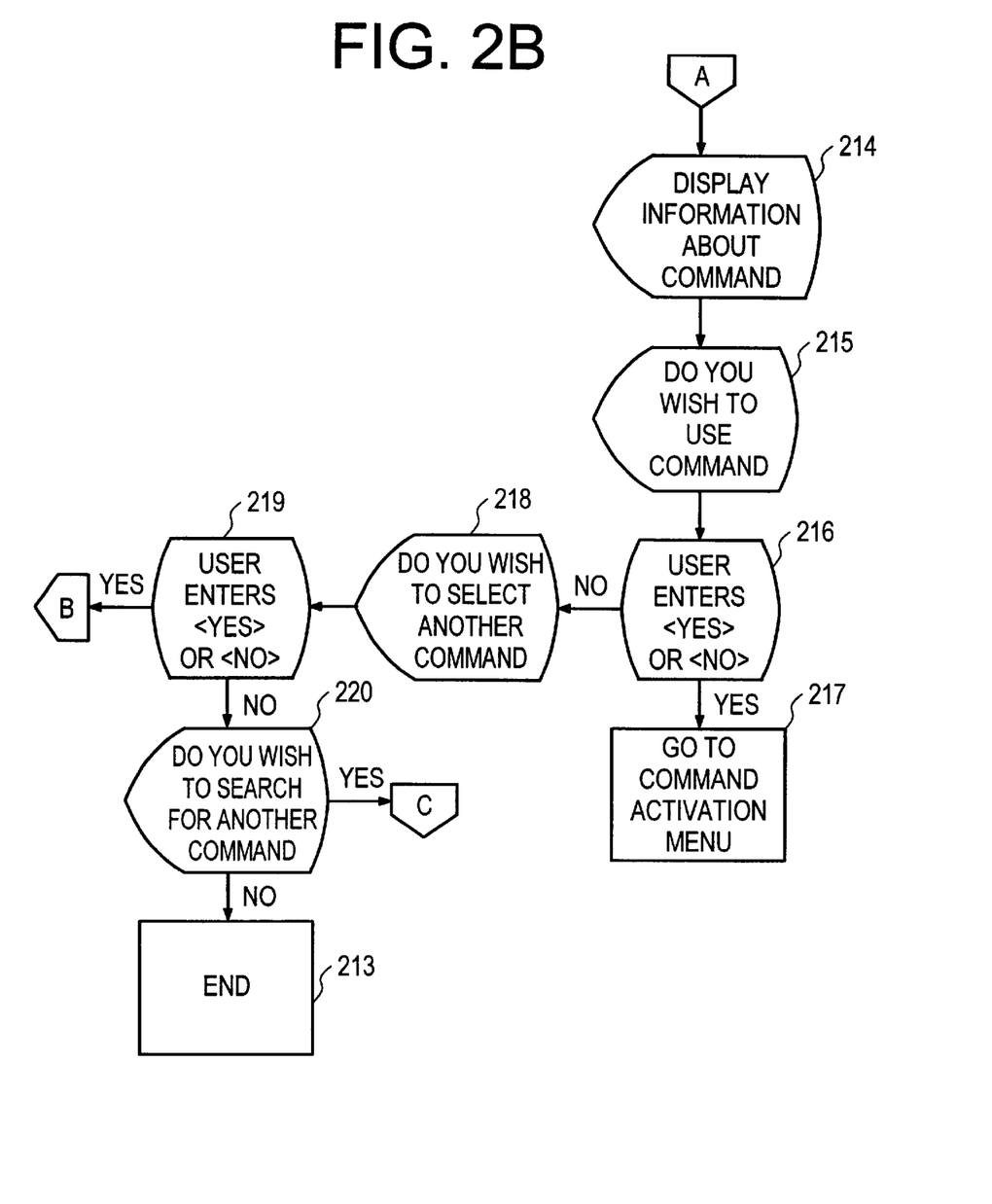

The following description is explained in conjunction with FIGS. 2A and 2B; however, one skilled in the art will appreciate that the order of commands and display screens are for illustration only and that numerous variations and sequences of displays are possible without departing from the spirit and scope of the invention. Turning to FIG. 2, when the user switches the phone ON 201 or, alternatively after a change of the SIM, a questions may be presented to the user. For example, "Do you wish to search for a command?" can be displayed at step 202. Therefore, according to this embodiment, the user does not have to be familiar with how to activate the help search function. Activation of the search function may also be provided directly from other modes or menus during phone operation (e.g., via a hard or 'soft' key) allowing the help search function to be easily accessible by the user at all times which are described in further detail below. The user then replies to the question at step 203 and may now search for all commands regarding a specific subject (e.g., 'clock'), or for a specific command (e.g., set clock) at 205.

One important feature of the invention is that the search function is intelligent with respect to the comparison abilities. For example, if the user searches for 'Swedish' all menus and commands related to language setting will be shown. For instance, this can be implemented as a table in which the first column of the table contains all commands and menu names and the other columns of the table contain terms associated with the commands and menu names in the first column. As an example, the first column can contain "settings language" and the other columns in the same row of the table then contain language names such as Swedish, English, German etc. The search function will primarily search in the first column, and secondarily among the associating terms in the other columns. If no command or menu name can be found that matches the user entered search string, the search for an associating term that matches start. If found, the search function stores the command or menu name found in the first column in the same row, in a temporary memory. Thereafter the search continues for other occurrences of the entered search string. Note, the user may enter in a partial command name and the processor will then display a list of the closest commands matching the partial entry 206.

After the processor finds the command, or the closest matching set of commands (e.g., for a search topic) they are displayed 207. The user is then prompted if they wish to proceed at 208. If the user wishes to continue, the user can then be prompted to select a command 210. Information about what the selected command or function does and how it is activated will be displayed to the user at 214. If there is a list of commands or functions the user may select a command from the list for display of the corresponding 'help' information. If the user does not wish to see information regarding any of the displayed functions or commands the user is prompted if the user wishes to search for other commands or topics 211. If the user desires another search the processor returns to the initial display allowing the user to enter another search. If the user has finished, the mobile phone may be placed into another mode or stand-by mode to await further user action 213.

Once the user has been able to read the help information the user will be prompted to see if the user desires to use the command 215. If so the user will be sent to the appropriate command menu 217. The user may also jump to the command menu directly according to another exemplary embodiment of the invention as described in further detail below. If not the user will be prompted to see if they wish to view another one of the commands or functions that were originally found or if the user wishes to conduct another search at 220.
Menu Search Function According to another exemplary embodiment of the search-mode that may be used in conjunction with above-described embodiments, a user may quickly find a command or commands based on keying in an initial of the command without having to scroll or step through a number of menu screens. This can save the user both time and frustration from stepping through numerous menu screens. The keypad in the search-mode is used to write the initial of the function names for the search approach.

The user may place the phone in search-mode according to a number of different methods which will now be discussed in more detail in conjunction with FIG. 3. One skilled in the art will appreciate that these methods are not exhaustive and that other means can be used for entering the search-mode without departing from the scope or spirit of the invention.

Figure 3:
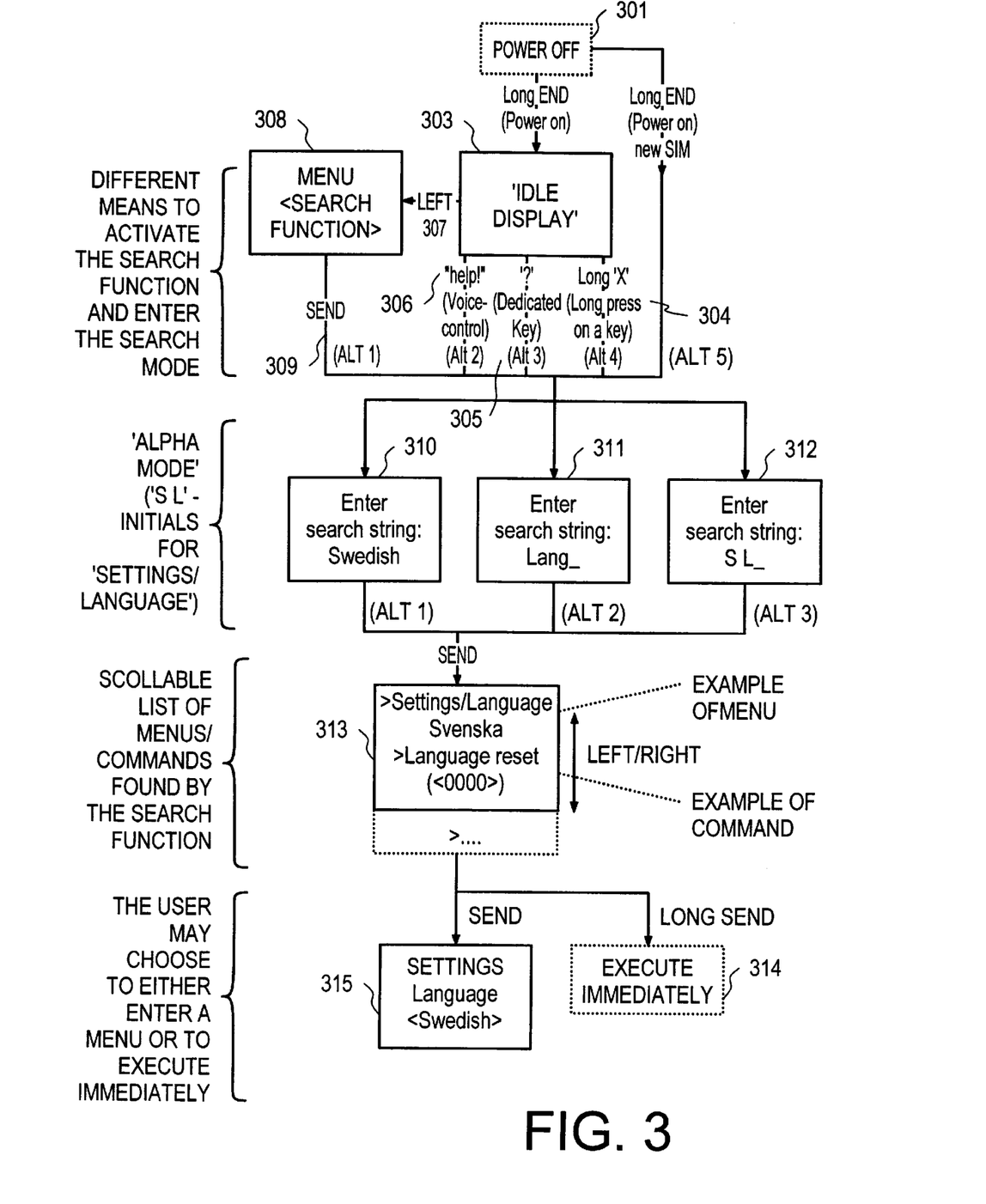
FIG. 3 is an exemplary flow diagram of the search-mode according to the present invention.

Turning to FIG. 3, Alpha-mode may be entered from a powered down state directly by executing a Power On 302 (e.g., holding down the End/No button for an extended time), or insertion of a new SIM (i.e., a new user of the mobile phone that may not be used to the phone.) Alternatively, after powering up the mobile phone could enter an idle display 303 ready to enter various functions for controlling the phone. From the idle display 303, the search-mode could be entered through voice control (for example, stating 'help'), via a dedicated key (e.g., pressing the <CLR> button or volume keys), or through a long X (e.g., a long press or holding of a key). Another alternative would be to enter the general menu 308 and activate the search function through a menu option. According to this embodiment the user would select the "Search Function" from the menu by pressing the <SEND> button, for example.

Once in search-mode the user will be prompted to enter a search string such as a topic 310, partial command 311, or the initial or initials of the command or function name 312 that user wishes to find. Alternatively, the user may enter a single initial to obtain a group of commands or functions beginning with that initial. This can aid a user to find commands without knowing the full name of the function or command. Once the user has input the initials through the keypad they are displayed and the user can proceed by pressing the <YES> or <SEND> button, whereby various results can be obtained. For example, from this state the user may choose a particular menu to view such as SETTINGS 315 by selecting a menu from the search list and executing a <SEND> command. Alternatively, the user could immediately execute a particular function 314 by selecting the function and executing a long <SEND> (i.e., holding down the <SEND> key).

Search Engine

In order to find a particular command or menu in the search-mode all that is necessary is for the user to enter an initial or partial set of initials or character string. The mobile phones processor may then execute a search algorithm to identify the possible menus or functions that correspond to the initial or character string. The search algorithm may be implemented as described in the text of FIG. 2. After search for the command one of at least two possible results can occur.

1. Final Result: In this case, the written initials allow the processor to find a unique function name. The user may then proceed to the function and execute or activate the command or function from the displayed menu. (See, e.g., Example 1 described below.)
2. Functions List: In this case, the written initials have not been enough to find a unique function name. According to this alternative embodiment, a list of all functions listed in alphabetic order of initials is provided to the user, whereby the user can select the desired function from the list provided. (See, e.g., Example 2 described below.)

Figure 4:
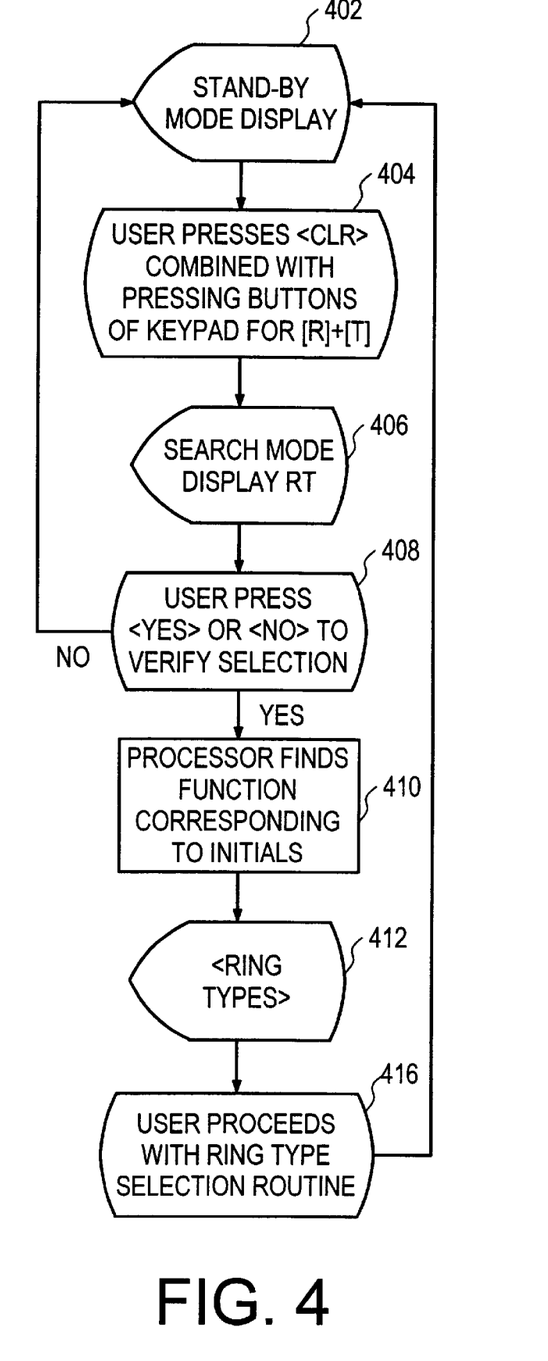
FIG. 4 is an exemplary of operation in search-mode.

Two examples of the search-mode in operation are explained below in conjunction with FIGS. 4 and 5.

EXAMPLE 1

According to this example, assume that the user wants to use the Function <Ring Type> in order to set a new melody to be played on the phone associated with receiving a call.

From stand-by mode display 402, to enter search-mode, the user presses the <CLR> button combined with pressing the buttons of the keypad for [R] and [T] letters 404. The letter corresponding to the keys pressed by the user are displayed 406. The user is then prompted to proceed with the search 408. By pressing the <YES> button the processor attempts to find any functions that have the initials R and T, in that order 410. Assuming only the function <Ring Type> is associated with these initials the results the search are displayed on the menu as <Ring Type> 412. From this menu the user may then directly start the routine for setting ring type 416. It should be noted that the user may at this point activate the search help, as described above, in order to be provided with an explanation of the <Ring Type> command and its uses.

EXAMPLE 2

No Unique Function Name

Figure 5:
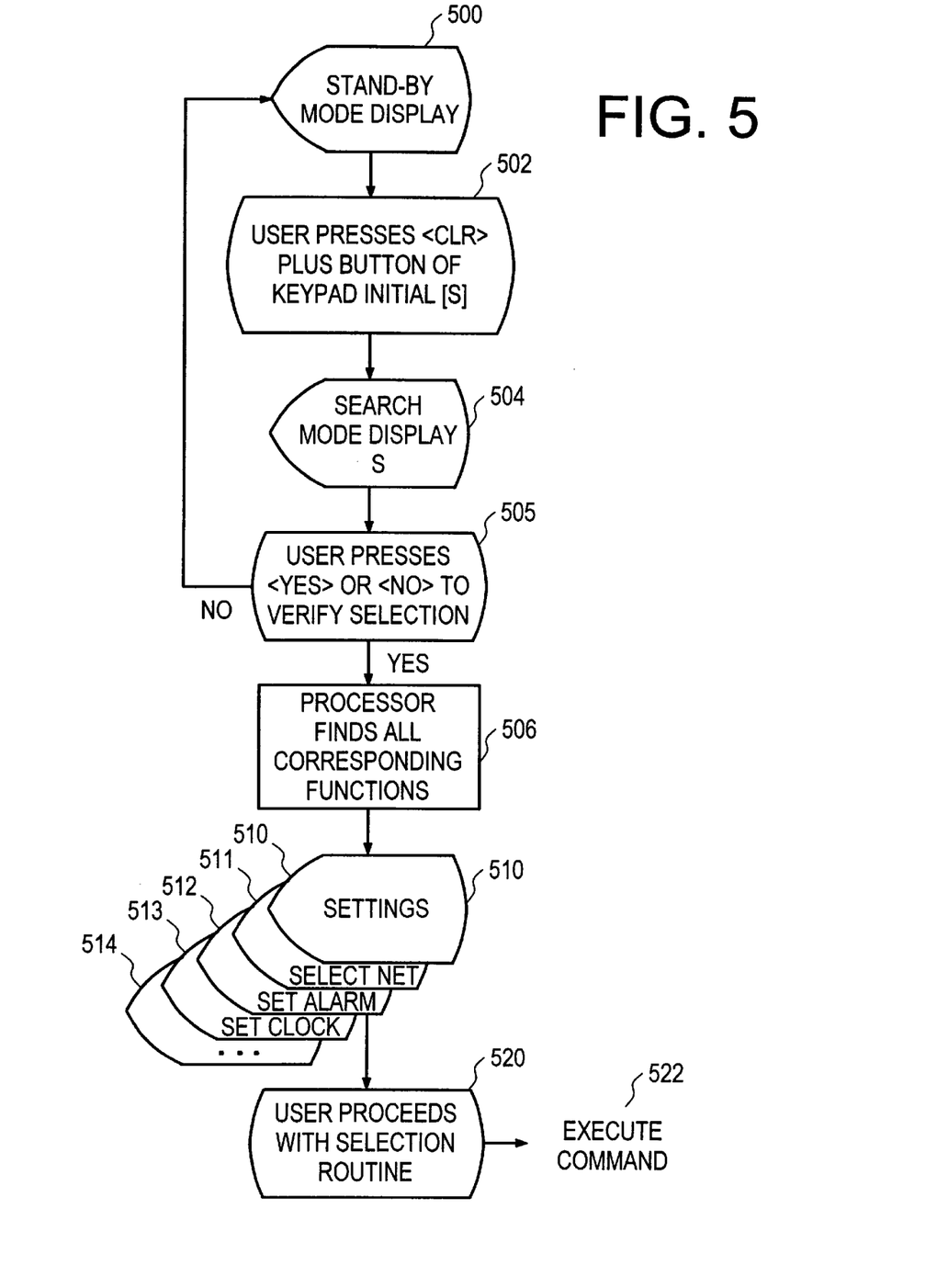
FIG. 5 is an alternative example of operation in search-mode.

Turning to FIG. 5 now consider that the user wants to find the <Set Alarm> function to set an alarm for the phone but only remembers that the function's name starts with Set. According to this embodiment the user first presses <CLR> button 502 to enter the search-mode from stand-by mode display 500. The user then enters the initial letter for Set 502, i.e., "S." An S is displayed 504 and the user is then prompted to continue 505. By pressing <YES> button the processor then retrieves a list of all function's names which uses the initial S. If there is a limitation for the use of the display rows the user can alternatively display of the functions that were retrieved by using a key to page through the displays. Alternatively, a list of functions can be displayed all at once. In either case the user can look through the list of retrieved function names 510–514 by using the arrows to go through the list by pressing the left arrow two times to arrive at set alarm. The command can then be selected 520 by pressing another key to activate the function or command routine needed to set or activate the function. If a list of functions can be displayed some means of indication of the current function can be used such as highlighting, flashing cursor, etc.

Many advantages are realized through the use of the search-mode. One advantage is that the user does not need to remember the exact position of the functions in the menu structure. In addition, the total number of buttons or steps needed to find functions in the menu in the menu is decreased. Moreover, faster and easier location of the functions in the menu is possible with simple execution of the function once the desired function has been determined.

The present invention has been described by way of example, and modifications and variations of the exemplary embodiments will suggest themselves to skilled artisans in this field without departing from the spirit of the invention. For example, although the preferred embodiments have been described in conjunction with a menu and commands for a mobile phone, one skilled in the art will appreciate that the menu and function control and selection can be used with any type of hierarchical menu format, such as that found in computers, remote controls, etc., and could also be implemented therein according to the present invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. A mobile phone comprising:

a transceiver for sending and receiving radio signals;

a display for displaying functions associated with controlling the mobile phone and information indicating how to activate the functions;

an input circuit for receiving user selected data; and a man-machine interface for performing and executing functions of the mobile phone, wherein said man-machine interface may be placed in a search-mode in order to search for and display functions and display information indicating how to activate the functions of the mobile phone based on said received user selected data.

2. The mobile phone according to claim 1, wherein said user selected data is at least one initial of a character name for a menu or function and said man-machine interface provides for display of all functions or menus associated with said initial.

3. The mobile phone according to claim 2, further comprising a selection circuit for selecting at least one of the displayed functions or menus and displaying information about the selected function and its operation.

4. The mobile phone according to claim 2, further comprising a selection circuit for selecting at least one of the displayed functions and for executing said selected function.

5. The mobile phone according to claim 2, wherein said mobile phone can be placed in the search-mode by pressing a clear <CLR> button and simultaneously entering at least one initial.

6. A mobile phone according to claim 2, wherein said mobile phone can be placed in the search-mode by at least one of a voice control circuit, a dedicated key, and a pressing and holding of a key.

7. A mobile phone according to claim 6, wherein said dedicated key is a clear button or a volume control key.

8. A method for selecting a function from a hierarchical menu in a mobile phone having a keypads comprising the steps of:

placing the mobile phone in a search-mode;

entering with said keypad at least one character that is associated with a desired function;

processing said at least one entered character to search said menu for all functions associated with said at least one entered character;

displaying any functions found to be associated with said at least one entered character; and displaying information indicating how to activate the functions.

9. A method according to claim 8 further comprising the step of selecting a function from said displayed functions and executing the function.

10. A method according to claim 8 further comprising the step of selecting a function from said displayed functions and displaying information regarding the operation of said selected function.

11. A method according to claim 8, wherein said mobile phone is in an idle mode and said step of placing the mobile phone in a search-mode includes pressing a volume key of the mobile phone.

12. A method according to claim 8, wherein said step of placing the mobile phone in a search-mode comprises pressing a dedicated key of said keypad.

13. A method according to claim 8, wherein said step of placing the mobile phone in a search-mode comprises executing a long pressing of a key of said keypad.

14. A method according to claim 8, wherein said step of placing the mobile phone in a search-mode comprises receiving a voice command to enter the search-mode.

15. A method according to claim 8, wherein said step of placing the mobile phone in a search-mode comprises selecting a command from said menu.

16. A method for searching a hierarchical menu, comprising the steps of:

placing a mobile phone in a search-mode of operation;

entering a search request based on a desired function via an interface;

determining all functions of the mobile phone associated with said search request;

displaying said determined functions and displaying information indicated how to activate the determined functions.

17. A method according to claim 16 further comprising the step of selecting a function from said displayed functions and executing the function.

18. A method according to claim 16 further comprising the step of selecting a function from said displayed functions and displaying information regarding the operation of said selected function.

19. A method according to claim 16, wherein said mobile phone is in an idle mode and said step of placing the mobile phone in a search-mode includes pressing a volume key of the mobile phone.

20. A method according to claim 16, wherein said step of placing the mobile phone in a search-mode comprises pressing a dedicated key of said keypad.

21. A method according to claim 16, wherein said step of placing the mobile phone in a search-mode comprises executing a long pressing of a key of said keypad.

22. A method according to claim 16, wherein said step of placing the mobile phone in a search-mode comprises receiving a voice command to enter the search-mode.

23. A method according to claim 16, wherein said step of placing the mobile phone in a search-mode comprises selecting a command from said menu.

* * * * *